United States Patent
Lawrence et al.

(10) Patent No.: US 8,667,013 B1
(45) Date of Patent: *Mar. 4, 2014

(54) SYSTEMS AND METHODS FOR DETERMINING AN ARTICLE ASSOCIATION MEASURE

(75) Inventors: Stephen R. Lawrence, Mountain View, CA (US); Niniane Wang, Santa Clara, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/360,593

(22) Filed: Jan. 27, 2012

Related U.S. Application Data

(63) Continuation of application No. 10/882,066, filed on Jun. 30, 2004, now Pat. No. 8,131,754.

(51) Int. Cl.
  G06F 17/30 (2006.01)
  G06F 7/00 (2006.01)

(52) U.S. Cl.
  USPC .......................................... 707/771; 707/758

(58) Field of Classification Search
  USPC .......................................... 707/770–775, 758
  See application file for complete search history.

(56) References Cited

U.S. PATENT DOCUMENTS

| | | | |
|---|---|---|---|
| 6,651,054 B1 | 11/2003 | de Judicibus | |
| 2004/0030741 A1 | 2/2004 | Wolton et al. | |
| 2004/0036716 A1 | 2/2004 | Jordahl | |
| 2005/0222981 A1* | 10/2005 | Lawrence et al. | 707/3 |
| 2007/0276829 A1* | 11/2007 | Wang et al. | 707/7 |
| 2007/0282797 A1* | 12/2007 | Wang et al. | 707/3 |
| 2008/0005090 A1* | 1/2008 | Khan et al. | 707/4 |

OTHER PUBLICATIONS

White, R.W. et al., "An Approach for Implicitly Detecting Information Needs," CIKM'03, ACM, Nov. 3-8, 2003, pp. 504-507.

* cited by examiner

*Primary Examiner* — Hosain Alam
*Assistant Examiner* — Navneet K Ahluwalia
(74) *Attorney, Agent, or Firm* — Fenwick & West LLP

(57) ABSTRACT

Systems and methods for determining an article association measure are described. In one described method, a computer program receives a first article identifier associated with a first attribute and a second article identifier associated with a second attribute and determines a similarity measure of the first article identifier to the second article identifier based at least in part on the first attribute and on the second attribute. The similarity measure may provide a means for associating various article identifiers so that they may be, for example, retrieved and/or ranked in subsequent search queries.

19 Claims, 3 Drawing Sheets

SYSTEMS AND METHODS FOR DETERMINING AN ARTICLE ASSOCIATION MEASURE

RELATED APPLICATIONS

This application is a continuation of U.S. patent application Ser. No. 10/882,066, filed on Jun. 30, 2004, now U.S. Pat. No. 8,131,754 which is incorporated herein by reference.

FIELD OF THE INVENTION

The present invention relates generally to systems and methods for information retrieval. The present invention relates particularly to systems and methods for determining an article association measure.

BACKGROUND

Conventional search engines receive a search query from a user and execute a search against a global index. Such conventional search engines typically use one or more conventional methods for performing a search. For example, one known method, described in an article entitled "The Anatomy of a Large-Scale Hypertextual Search Engine," by Sergey Brin and Lawrence Page, assigns a degree of importance to an article, such as a web page, based on the link structure of the web. The search results are often presented in a list format, comprising article identifiers and brief snippets about the articles in a web page that can be resized.

Often, a user mentally associates articles that the user accesses close in time, that comprise similar content, or that originate from similar sources. In conventional information retrieval systems, the user is often unable to retrieve the articles since the association between the articles that is of interest to the user may not be captured by the information retrieval system. For example, the conventional search engines are unlikely to capture the fact that a user has printed two articles in rapid succession.

SUMMARY

Embodiments of the present invention provide systems and methods for determining an article association measure. In one embodiment of the present invention, a computer program receives a first article identifier associated with a first attribute and a second article identifier associated with a second attribute and determines an association measure of the first article identifier to the second article identifier based at least in part on the first attribute and on the second attribute. The association measure provides a means for associating various article identifiers so that they may be, for example, retrieved and/or ranked in subsequent search queries.

These illustrative embodiments are mentioned not to limit or define the invention, but to provide examples of embodiments of the invention to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Figure 1:
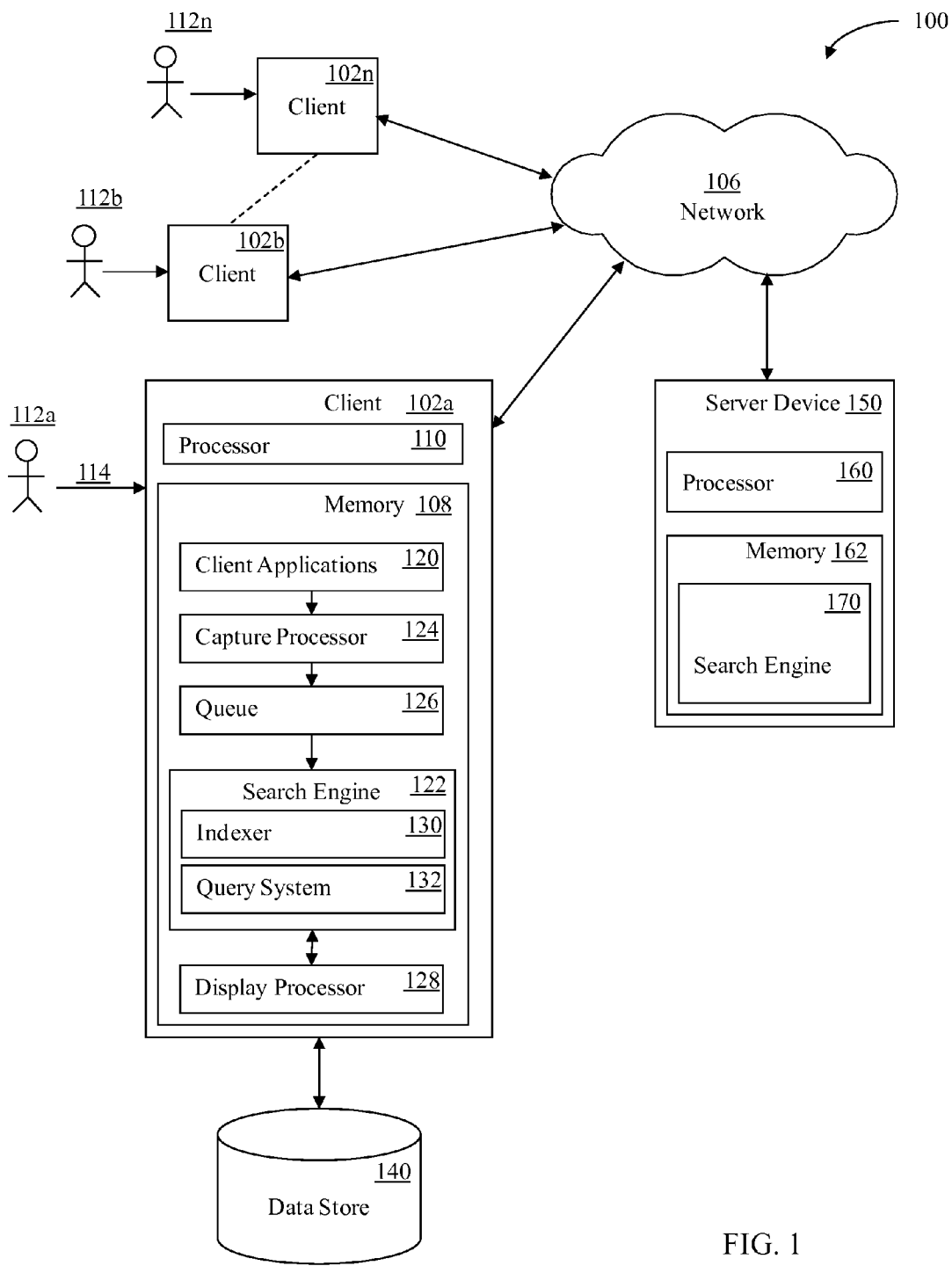
FIG. 1 is a block diagram illustrating an illustrative environment in which one embodiment of the present invention may operate.

Embodiments of the present invention provide systems and methods for determining an article association measure. Referring now to the drawings in which like numerals indicate like elements throughout the several figures, FIG. 1 is a block diagram illustrating an illustrative environment for implementation of an embodiment of the present invention. While the environment shown reflects a client-side search engine architecture embodiment, other embodiments are possible.

System Architecture

The system 100 shown in FIG. 1 includes multiple client devices 102a-n in communication with a server device 150 over a wired or wireless network 106. The network 106 shown comprises the Internet. In other embodiments, other networks, such as an intranet, may be used instead. Moreover, methods according to the present invention may operate within a single client device.

The client devices 102a-n shown each includes a computer-readable medium 108. The embodiment shown includes a random access memory (RAM) 108 coupled to a processor 110. The processor 110 executes computer-executable program instructions stored in memory 108. Such processors may include a microprocessor, an ASIC, a state machine, or other processor, and can be any of a number of computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be connected to a network 106 as shown, or can be stand-alone machines. Client devices 102a-n may also include a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any operating system, such as Microsoft® Windows® or Linux, capable of supporting one or more client application programs. For example, the client device 102a shown comprises a personal computer executing client application programs, also known as client applications 120. The client applications 120 can be contained in memory 108 and can include, for example, a word processing application, a spreadsheet application, an e-mail application, an instant messenger application, a presentation application, an Internet browser application, a calendar/organizer application, and any other application capable of being executed by a client device.

The user 112a can interact with the various client applications 120 and articles associated with the client applications 120 via various input and output devices of the client device 102a. Articles include, for example, word processor, spreadsheet, presentation, e-mail, instant messenger, database, and other client application program content files or groups of files, web pages of various formats, such as Hypertext Markup Language (HTML), eXtensible Markup Language (XML), eXtensible Hypertext Markup Language (XHTML), Portable Document Format (PDF) files, and audio files, video files, or any other documents or groups of documents or information of any type whatsoever.

The memory 108 of the client device 102a shown also contains a capture processor 124, a queue 126, and a search engine 122. The client device 102a shown also contains or is in communication with a data store 140. The search engine 122 can receive an explicit query from the user 112a or generate an implicit query and retrieve information from the data store 140 in response to the query.

The search engine 122 shown contains an indexer 130, a query system 132, and a formatter 134. Events and performance data can be sent by the queue 126 to the query system 132 to provide the query system 132 with information concerning current user context. The query system 132 can use this information to generate an implicit query. The query system 132 can also receive and process explicit queries from the user 112a.

The data store 140 can be any type of computer-readable media and can be integrated with the client device 102a, such as a hard drive, or external to the client device 102a, such as an external hard drive or on another data storage device accessed through the network 106. The data store 140 may include any one or combination of methods for storing data, including without limitation, arrays, hash tables, lists, and pairs.

In the embodiment shown in FIG. 1, a user 112a can input an explicit query into a search engine interface displayed on the client device 102a, which is received by the search engine 122. The search engine 122 can also generate an implicit query based on a current user context or state, which can be determined by the query system 132 from contextual real time events. Based on the query, the query system 132 can locate relevant information in the data store 140 and provide a result set. In one embodiment, the result set comprises article identifiers identifying articles associated with the client applications 120 or client articles. Client articles stored in the data store 140 include articles associated with the user 112a or client device 102a, such as word-processing documents, previously viewed web pages and any other article associated with the client device 102a or user 112a. In another embodiment, the result set also comprises identifiers identifying articles located on the network 106 or network articles located by a search engine on a server device. Network articles include articles located on the network 106 not previously viewed or otherwise referenced by the user 112a, such as web pages not previously viewed by the user 112a.

The result sets comprise one or more article identifiers. An article identifier may be, for example, a Uniform Resource Locator (URL), a file name, a link, an icon, a path for a local file, or anything else that identifies an article. In the embodiment shown, an article identifier comprises a URL associated with an article.

Messaging articles stored in the data store 140 include user's emails, chat messages, and instant messaging messages. Each time a message is received, sent, modified, printed, or otherwise accessed, a record is stored in the data store 140. This information can later be searched to identify messages that should be displayed in the user interface.

An embodiment of the present invention may also store message threads in the data store 140. In such an embodiment, messages are related together by various attributes, including, for example, the sender, recipient, date/time sent and received, the subject, the content, or any other attribute of the message. The related messages can then be retrieved as a thread, which may be treated as a document by the display processor 128.

The data store 140 comprises a local index. The local index in the embodiment shown in FIG. 1 may comprise information, such as articles, which are associated with the client device 102a, a user 112a of the client device 102a, or a group of users of the client device 102a. For example, the local index in the data store 140 shown in FIG. 1 may comprise an index of articles created, edited, received, or stored by the client user 112a using the client machine 102a, or articles otherwise associated with the client user 102a or the client machine 112a. The local index may be stored in a client machine, such as in data store 140, in a data store on a local network in a manner accessible by the client machine, on a server accessible to the client machine through the Internet, or in another accessible location.

In contrast, a global index may comprise information relevant to many users or many servers, such as, for example, an index of web pages located on multiple servers in communication with the World Wide Web. One example of a global index is an index used by the Google™ search engine to provide search results in response to a search query.

A single index may comprise both a local and a global index. For example, in one embodiment, an index may comprise both local and global information, and include a user or client identifier with the local information so that it may be identified with the user(s) or client(s) to which it pertains. Moreover, an index, local or global, may be present in one or multiple logical or physical locations.

The formatter 134 can receive the search result set from the query system 132 of the search engine 122 and can format the results for output to a display processor 128. In one embodiment, the formatter 134 formats the results in XML or HTML. The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting HTML pages. In one such embodiment, the HTTP server comprises a scaled-down version of the Apache Web server. In various embodiments, the functions described herein may be performed by various other components and devices.

Through the client devices 102a-n, users 112a-n can communicate over the network 106, with each other and with other systems and devices coupled to the network 106. As shown in FIG. 1, a server device 150 is also coupled to the network 106. In the embodiment shown, the search engine 122 can transmit a search query comprised of an explicit or implicit query or both to the server device 150. The user 112a can also enter a search query in a search engine interface, which can be transmitted to the server device 150. In another embodiment, the query signal may instead be sent to a proxy server (not shown), which then transmits the query signal to server device 150. Other configurations are also possible.

The server device 150 shown includes a server executing a search engine application program, such as the Google™ search engine. Similar to the client devices 102a-n, the server device 150 shown includes a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill.

Memory 162 contains the search engine application program, also known as a search engine 170. The search engine 170 locates relevant information in response to a search query from a client device 102a. The search engine 122 then provides the result set to the client device 102a via the network 106. The result set 134 comprises one or more article identifiers. An article identifier may be, for example, a URL, a file name, a link, an icon, a path for a local file, or anything else that identifies an article. In the embodiment shown, an article identifier comprises a URL associated with an article.

In the embodiment shown, the server device 150, or related device, has previously performed a crawl of the network 106 to locate articles, such as web pages, stored at other devices or systems connected to the network 106, and indexed the articles in memory 162 or on another data storage device.

It should be noted that embodiments of the present invention may comprise systems having different architecture than that which is shown in FIG. 1. For example, in some systems according to the present invention, server device 150 may comprise a single physical or logical server, or there may be no server device. The system 100 shown in FIG. 1 is merely illustrative, and is used to explain the illustrative methods shown in FIGS. 2 and 3.

Process

Various methods may be implemented in the environment shown in FIG. 1 and other environments, according to the present invention. Methods according to the present invention may be implemented by, for example, a processor-executable program code stored on a computer-readable medium.

In one embodiment of the present invention, a computer program, such as the query system 132, receives a first article identifier associated with a first attribute and a second article identifier associated with a second attribute and determines an association measure of the first article identifier to the second article identifier based at least in part on the first attribute and on the second attribute. The association measure provides a method of associating various article identifiers so that they may be, for example, retrieved and/or ranked in subsequent search queries. The association measure may also be referred to as an association score or similarity measure.

The process may approximate a method or association that a user would perform implicitly. In other words, a user may draft a word-processing document and send it to another user. The two events and the two articles, the word-processing document and email message, are related or associated from the user's perspective.

The determination of the association measure may be performed in various ways. For example, the indexer 130 may create the associations between articles and/or events associated with the articles, i.e., the indexer 130 may determine the associated events/articles during indexing and store that information in the data store 140. The information can then be used at query time. In another embodiment, the query system 132 generates association information at query time. Alternatively, part of the processing may be done by the indexer 130 at indexing time and part done by the query system 132 at query time. For example, in one embodiment, association-in-content scores may be computed at indexing time by the indexer 130, while association-in-time scores are computed at query time by the query system 132. Association in time and association in content are described in further detail below.

The attribute may comprise any of a number of attributes of the article associated with the article identifier or with events associated with the article. The association may be between attributes of the article. In one embodiment, the association is between attributes of events associated with the article. Each article may be associated with one or more events. For instance, one article may be associated with four events, which correspond to the user viewing the article at times $t_1$, $t_2$, $t_3$, and printing the article at time $t_4$.

Figure 2:
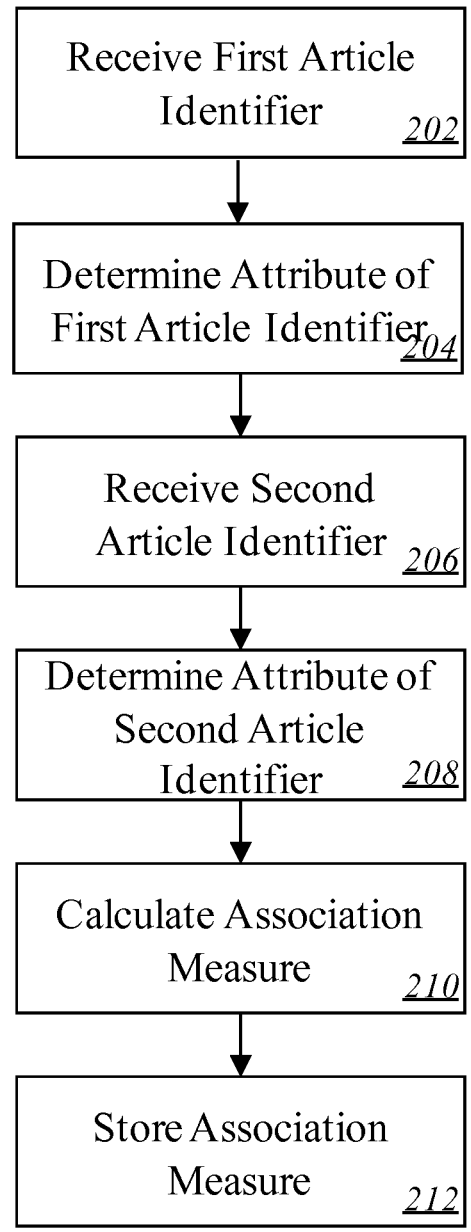
FIG. 2 is a flowchart illustrating a method of computing an association measure for an article pair in one embodiment of the present invention.

FIG. 2 is a flowchart illustrating a method of computing an association measure for an article pair in one embodiment of the present invention. The query system 132 receives a first article identifier 202. For example, the query system 132 may receive a first article identifier as part of a result set received in response to an explicit or implicit query submitted to a search engine.

The query system 132 determines an attribute associated with the first article identifier 204. The attribute may comprise, for example, source, metadata, or content attributes, including, for example, the creation time, content, or source of the article associated with the article identifier.

Each article may be associated with one or more attributes directly or indirectly. Embodiments of the present invention may include event capture.

As one example, an event may be captured when an email message is sent. The email message may comprise the article in such an embodiment. The email message or the associated event (e.g., sending the email message) may include attributes, such as the recipient of the email message, the time the email message was sent, the subject, the content, and other attributes. These attributes are stored with the event, and the query system 132 may make use of these attributes to search for associated events and articles associated with the events. Another event may be captured when an article comprising a word-processing document is printed. If the article is printed soon after the email message is received, the email message and word-processing document may be associated.

The query system 132 receives a second article identifier 206. For instance, by searching for events that occur near in time to an event associated with the first article. The query system then determines an attribute of the second article identifier 208. For example, if the first attribute is a date-time attribute, the second attribute may be a date-time attribute as well. The query system 132 then calculates an association measure or for the pair of articles based on the attributes 210.

The association measure is a measure corresponding the similarity, relevancy, or other suitable measure indicating that two or more articles or events associated with the articles are associated. In the embodiment shown in FIG. 2, the query system then stores the association measure with the identifiers of the two associated articles 212.

For example, an email message may include the term "budget" in the subject line. A word-processing article may comprise the term "budget" fifty times in the text. The query system 132 determines that these articles are similar. The query system 132 performs the association calculation for each pair of articles. In alternative embodiments, the indexer 130 may perform all or part of the computation instead of, or in addition to, the query system 132.

Association in Time

Articles may be associated because events associated with the articles occur nearby in time. For example, in one embodiment, the query system identifies a first article, article a, finds all events related to article a, and then for each event e does the following: scan the other events $e_1$ occurring nearby in time to event e, computes an association measure (e.g., an association score), and adds the association measure to a sum for the article associated with the other event For instance, events $e_1$ and $e_2$ are associated with article a, and events $e_3$ and $e_4$ are associated with article b. Event $e_1$ is nearby in time to $e_3$, and $e_2$ is nearby in time to $e_4$. If the score for the time difference in each case is 1, article b would have an association score of 1+1=2 for its association with article a. Similarly, if events $e_5$ and $e_6$ are related to article c, and they occur nearby in time to $e_1$ and $e_2$ but not as close in time as events $e_3$ and $e_4$. The score for the time difference may be less, e.g., the score for the time difference between $e_1$ and $e_3$ and between $e_2$ and $e_4$ is 0.5, then, the association score for article c with respect to article a is 0.5+0.5=1.

The process of calculating the association score may be repeated for every article that is related to events nearby in time to events associated with the article of interest. In one embodiment, the articles may be ranked by the association score. In the example above, for article a, article b has an association score of 2 and article c has a score of 1. In one embodiment, scores are determined for a plurality of associated articles, and only the top n (e.g., twenty) articles are displayed or otherwise considered. The associated articles may be combined with regular search results or they may be displayed separately, e.g., below each search result, to the right of the search results, or in the sidebar. The database is organized such that is easy and efficient to retrieve events that occur nearby in time, e.g., for a given event, the n events occurring before/after that event may be easily retrieved and the association score accordingly computed accordingly.

In one embodiment, the association measure is determined to be 1 if the time difference between two events is below a threshold. Otherwise, the association measure is determined to be 0. In another embodiment, the association measure may vary linearly from 0 at a maximum time difference threshold, to a maximum of 1 at a difference of 0 in time. In yet another embodiment, another suitable function is used, such as a polynomial, linear, piecewise linear, or exponential function. The association measure is higher for lower time differences and lower for higher time differences.

Other association measures may be associated with events and types of events. For example, an article may be associated with a bookmarking event and a viewing event. In one embodiment, bookmarking an article may have a higher relevancy or interest score than viewing an article. The score derived in relation to these events may be combined with the time-difference score. For example, this score may be multiplied by the time difference score to arrive at the association measure.

For example, the article identifier is associated with an article, and the article includes a date and time on which the article was created, edited, loaded, viewed, saved, or otherwise acted upon, interacted with, or accessed or is associated with an event that includes one or more attributes. The query system 132 may use the date-time attributes to determine the association measure. The query system 132 may calculate the association measure by determining the difference between a date-time attribute associated with the first article identifier and a second date-time attribute associated with the second article identifier.

In one embodiment, two events, a and b, occurring at times $t_a$ and $t_b$, and corresponding to two articles, $a_1$ and $a_2$, result in an association between $a_1$ and $a_2$ according to the difference in time, with smaller time differences receiving a higher association score. The association score for these two articles is summed over all occurrences of the articles in events. The articles may be stored in relation to multiple events and may be more or less associated with one another depending on the event. For instance, two articles may be printed one after another on a first day, resulting in a high association score. On another day, one may be printed in the morning and the second in the afternoon, resulting in a lower association score.

The association score may be based on various attributes of the articles. In one embodiment, the association score is based on the time attributes of the articles. For example, the association of $a_1$ to $a_2$ may be equal to the absolute value of the difference in the time attribute for each article, subtracted from a maximum time difference threshold, and divided by a normalization factor. If $a_1$ is printed at 9:00 am, and $a_2$ is printed at 9:15 am, the association score may be equal to 60 (maximum time difference threshold) minus 15 divided by the normalization factor, which may be equal to the maximum time difference threshold, e.g., 60, resulting in an association score of 0.75. In one embodiment, if the difference in the time attribute is greater than some maximum (e.g., one hour), the association score is set to zero. In other words, the articles are determined to be dissimilar based on the attribute.

Association in Content

Articles may be associated because attributes associated with the articles, such as the content (e.g., text), or content associated with events that are associated with the articles, is similar. Each article may be associated with one or more events, and the content may be different for different events. For example, an article a may have four events associated with it. Two of the events contain text $t_1$, and two contain text $t_2$; article b is associated with one event containing text $t_3$. In one embodiment, the query system 132, indexer 130, or other program computes an association measure between articles a and b by comparing the text $t_1$ with $t_3$ and comparing text $t_2$ with $t_3$. The results are then combined. In another embodiment, the program creates a combined or average representation of article a by combining $t_1$ and $t_2$ to create combined text $t_4$. The program then compares $t_3$ and $t_4$ to create an association measure between articles a and b in terms of content.

In one embodiment, the content association measure is computed based on an event e without referring to the associated article. For example, event e contains or is associated with text t, and text t can be used to locate associated events or associated articles without reference to the article associated with event e.

Association in Metadata

In yet another embodiment, the attributes comprise source or metadata attributes. The source or metadata attribute may comprise, for example, an author of an article associated with an article identifier, an organization, a physical location, or any other attribute that relates to the source of the article. The source or metadata attributes may alternatively be associated with events, which are associated with article identifiers. In one embodiment, articles may be associated because they share the same author, the same to: field, the same recipient, etc. As with content associations described above, an association measure in metadata may be computed without reference to the article to which an event refers.

Combined Association Measures

In one embodiment of the present invention, the query system 132 computes a plurality of association measures between two articles based on a plurality of attributes. The plurality of association measures may be combined to create a combined association measure. In another embodiment, the association measures for a pair of articles are normalized using a normalization factor to create a normalized association measure. The normalized association measure may increase the ease with which various article identifiers are ranked.

Using an Association Measure

Given one or more articles or one or more events, the query system 132 can locate related articles or related events based on the association measures. For example, a user performs a search and is provided with a list of events. Each event is associated with an article. The query system 132 finds related articles based on the association measures, and presents the related articles to the user. The query system 132 may present articles to the user (e.g., file f), or events (e.g., file f was saved at time t). The query system 132 may present associated items for each individual result or may combine them into one list of associated items. For instanced, a search returns two events, which may each reference different articles. The query system 132 may show two sets of associated items or may create a combined list of items associated to the two events.

In another embodiment, the query system 132 may also analyze "related event objects", e.g., a sequence of messages in a conversation may be in a related event object and the related event object may be thought of as an "article".

An article may be dissimilar (i.e., not associated) based on a first attribute and similar or associated based on a second attribute. For example, two articles may comprise very similar content but never be accessed in close time proximity. Accordingly, the association scores for the first and second article that are related to content would be high and those related to time would be low. The articles may be related by other attributes, including for example, the source of the article. The source may be the author, location, organization, or some other attribute that describes how or where the article was originated. The overall association score may be calculated as the sum of the various association scores.

The overall association score may combine the individual association scores with different weights. For example, in one embodiment, the overall association measure is calculated as follows: overall_association=w1*time_association+ w2*content association+w3*metadata_association. The weights w1, w2, and w3 may be set to specific values. In an alternative embodiment, the weights may be adjusted based on user interest measures, such as clickthrough. For example, if the user clicks on many articles that were presented to the user because of association in time, the weight for association in time may be increased.

Figure 3:
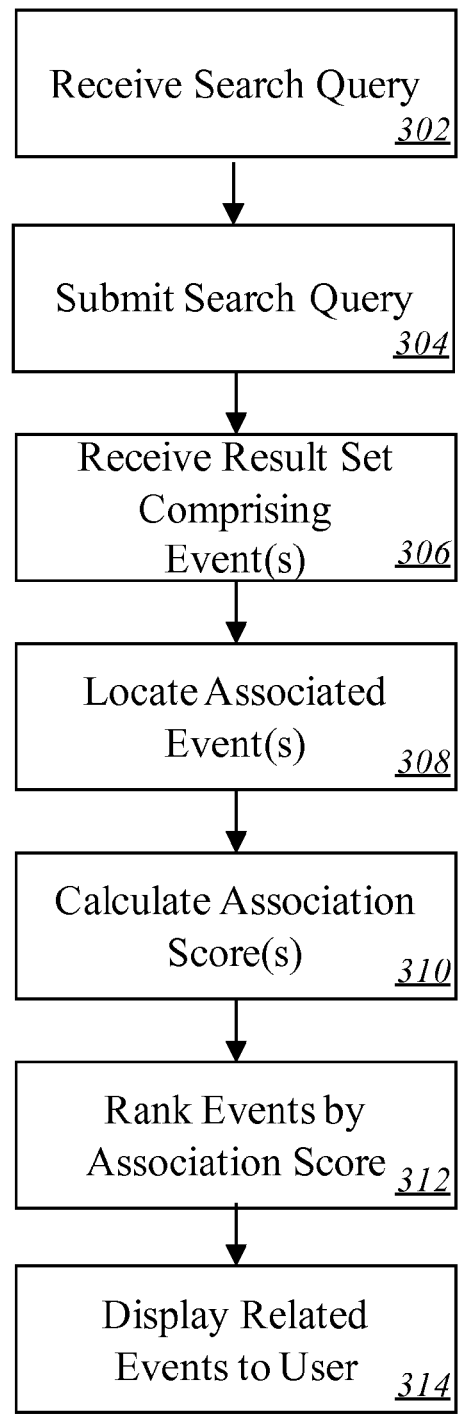
FIG. 3 is a flowchart illustrating a method of associative retrieval in one embodiment of the present invention.

FIG. 3 is a flowchart illustrating a method of associative retrieval in one embodiment of the present invention. In the embodiment shown, the query system 132 receives a search query 302. The search query may be, for example, a keyword query and is a search query for events. The search query 132 may have been generated in response to various actions by the user 112a or in response to some other activity on the client 102a. For example, the user 112a may submit an explicit query that triggers the execution of the search query. The query system 132 submits the search query 132 to an event database, such as database 140, to retrieve potentially related events 304. In response, the query system 132 receives a result set comprising one or more events that are related to the search query 306.

As described herein in relation to FIG. 1, the query system 132 captures events. One example of an event is printing a word-processing document; another example is sending an email message. Each of the events is associated with one or more articles. Each pair of articles may include an association score as described above in relation to FIG. 2.

Referring still to FIG. 3, the query system 132 locates one or more events that are related to each event in the result set 308. The event(s) located by the query system may relate to the original event to a greater or lesser degree. In order to determine the relevance, the query system 132 computes a relevance score for each related event 210. The relevance score is based on the association scores of the articles associated with the events. The query system 132 uses the relevance score to rank the events in the result set 312. The query system 132 then generates displays the related events to the user 314.

An embodiment of the present invention may allow the user to retrieve associated content that would otherwise be difficult or impossible to retrieve as a group. For example, a user may spend several hours researching digital cameras. Later, the user wishes to review results from the searches. Since the searches were performed during a relatively contiguous period of time and related in article identifiers associated with digital cameras, the article identifiers would have high association measures. When the user performs the subsequent explicit query, the query system 132 uses the high association measures to present the user with the previous search results.

In one embodiment, the user specifies the period of time during which the queries of interest were performed and may also specify keywords. For example, the user may know that the "digital camera" queries were performed two days ago in the morning. The user provides this information to the query system 132, which uses the information to identify events and associated article identifiers.

In one embodiment of the present invention, the query system 132 executes a query based on the content attribute associated with an article identifier. For example, the query system 132 identifies an email message as related in time to an article that has been received in response to a search query. The query system 132 extracts the content from the email message and executes a search query using keywords from the content. The query system 132 provides the results of the search query to the user, either combined with the original results or in a separate list.

The foregoing description of embodiments of the invention has been presented only for the purpose of illustration and description and is not intended to be exhaustive or to limit the That which is claimed:

1. A computer-implemented method comprising:
accessing data describing a plurality of captured events, wherein the events comprise interactions with articles;
for a first article identifier identifying a first article and associated with a first date-time attribute of a first one of the plurality of events, and for a second article identifier identifying a second article and associated with a second date-time attribute of a second one of the plurality of events:
- determining an association measure of the first article identifier to the second article identifier based at least in part on the first date-time attribute and on the second date-time attribute, the determining comprising:
  - determining a difference between the first date-time attribute associated with the first article identifier and the second date-time attribute associated with the second article identifier,
  - comparing the difference between the first date-time attribute associated with the first article identifier and the second date-time attribute associated with the second article identifier to a threshold, and
  - setting the association measure of the first article identifier to the second article identifier based at least in part on whether the difference between the first date-time attribute associated with the first article identifier and the second date-time attribute associated with the second article identifier exceeds the threshold;
receiving a query;
receiving search results as a result of query execution, the search results comprising the first article identifier and omitting the second article identifier;
identifying the second article identifier as being related to the first article identifier based at least in part on the association measure; and
responsive to identifying the second article identifier as being related to the first article identifier, including the second article identifier as part of the received search results.

2. The method of claim 1, wherein the difference varies inversely with the association measure.

3. The method of claim 1, wherein the association measure comprises a plurality of association measures, and further comprising combining the plurality of association measures to create a combined association measure.

4. The method of claim 3, wherein combining the plurality of association measures to create the combined association measure comprises weighting each association measure of the plurality of association measures according to a weight corresponding to a type of the association measure.

5. The method of claim 1, further comprising normalizing the association measure to create a normalized association measure.

6. The method of claim 1, wherein the association measure is computed using one of a linear, piecewise, or exponential function, wherein the measure indicates higher association for smaller differences.

7. The method of claim 1, wherein the first article identifier is further associated with a first content attribute and the second article identifier is further associated with a second content attribute, the method further comprising determining the association measure of the first article identifier to the second article identifier based at least in part on the first content attribute and on the second content attribute.

8. The method of claim 1, wherein the first article identifier is further associated with a first metadata attribute and the second article identifier is further associated with a second metadata attribute, the method further comprising determining the association measure of the first article identifier to the second article identifier based at least in part on the first metadata attribute and on the second metadata attribute.

9. The method of claim 8, wherein the first metadata attribute comprises an author.

10. The method of claim 8, wherein the first metadata attribute comprises an organization.

11. The method of claim 1, wherein the association score is determined by an indexer as part of indexing and applied as part of execution of a query.

12. The method of claim 1, wherein the association score is determined as part of execution of a query.

13. A non-transitory computer-readable storage medium on which is encoded executable program code, the program code comprising:
program code for accessing data describing a plurality of captured events, wherein the events comprise interactions with articles;
program code for, for a first article identifier identifying a first article and associated with a first date-time attribute of a first one of the plurality of events, and for a second article identifier identifying a second article and associated with a second date-time attribute of a second one of the plurality of events:
- determining an association measure of the first article identifier to the second article identifier based at least in part on the first date-time attribute and on the second date-time attribute, the determining comprising:
  - determining a difference between the first date-time attribute associated with the first article identifier and the second date-time attribute associated with the second article identifier,
  - comparing the difference between the first date-time attribute associated with the first article identifier and the second date-time attribute associated with the second article identifier to a threshold, and
  - setting the association measure of the first article identifier to the second article identifier based at least in part on whether the difference between the first date-time attribute associated with the first article identifier and the second date-time attribute associated with the second article identifier exceeds the threshold;
program code for receiving a query;
program code for receiving search results as a result of query execution, the search results comprising the first article identifier and omitting the second article identifier;
program code for identifying the second article identifier as being related to the first article identifier based at least in part on the association measure; and
program code for, responsive to identifying the second article identifier as being related to the first article identifier, including the second article identifier as part of the received search results.

14. The computer-readable storage medium of claim 13, wherein the association measure comprises a plurality of association measures, and further comprising program code for combining the plurality of association measures to create a combined association measure.

15. The computer-readable storage medium of claim 13, further comprising program code for normalizing the association measure to create a normalized association measure.

16. A computer system, comprising:
- a computer processor; and
- a non-transitory computer-readable medium storing processor-executable program instructions that when executed by the processor perform actions comprising:
    - accessing data describing a plurality of captured events, wherein the events comprise interactions with articles;
    - for a first article identifier identifying a first article and associated with a first date-time attribute of a first one of the plurality of events, and for a second article identifier identifying a second article and associated with a second date-time attribute of a second one of the plurality of events:
        - determining an association measure of the first article identifier to the second article identifier based at least in part on the first date-time attribute and on the second date-time attribute, the determining comprising:
            - determining a difference between the first date-time attribute associated with the first article identifier and the second date-time attribute associated with the second article identifier,
            - comparing the difference between the first date-time attribute associated with the first article identifier and the second date-time attribute associated with the second article identifier to a threshold, and
            - setting the association measure of the first article identifier to the second article identifier based at least in part on whether the difference between the first date-time attribute associated with the first article identifier and the second date-time attribute associated with the second article identifier exceeds the threshold;
    - receiving a query;
    - receiving search results as a result of query execution, the search results comprising the first article identifier and omitting the second article identifier;
    - identifying the second article identifier as being related to the first article identifier based at least in part on the association measure; and
    - responsive to identifying the second article identifier as being related to the first article identifier, including the second article identifier as part of the received search results.

17. The computer system of claim 16, wherein the first article identifier is further associated with a first content attribute and the second article identifier is further associated with a second content attribute, the actions further comprising determining the association measure of the first article identifier to the second article identifier based at least in part on the first content attribute and on the second content attribute.

18. The computer system of claim 16, wherein the first article identifier is further associated with a first metadata attribute and the second article identifier is further associated with a second metadata attribute, the actions further comprising determining the association measure of the first article identifier to the second article identifier based at least in part on the first metadata attribute and on the second metadata attribute.

19. The computer system of claim 18, wherein the first metadata attribute comprises an author.

* * * * *